UNITED STATES PATENT OFFICE.

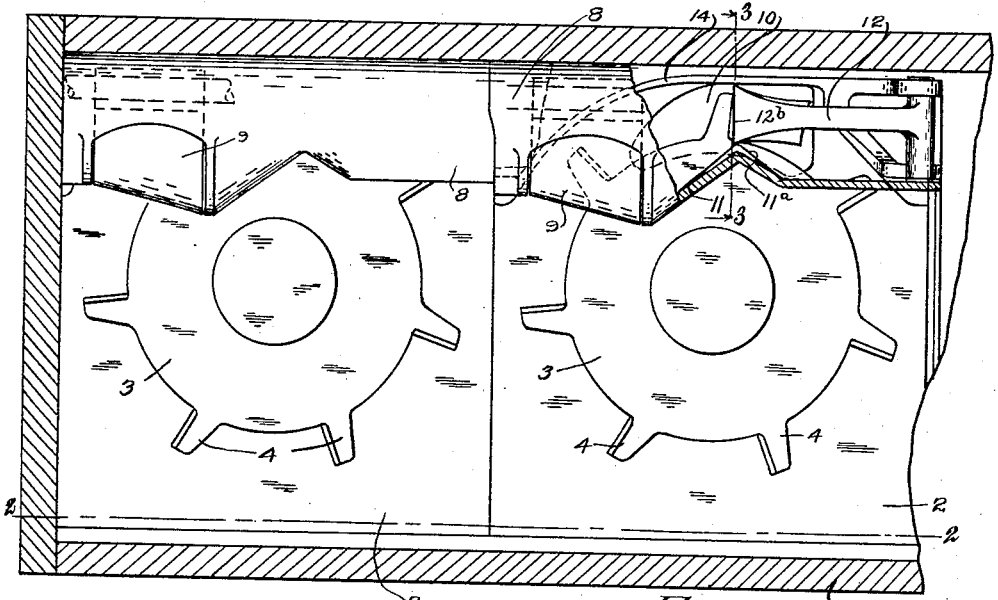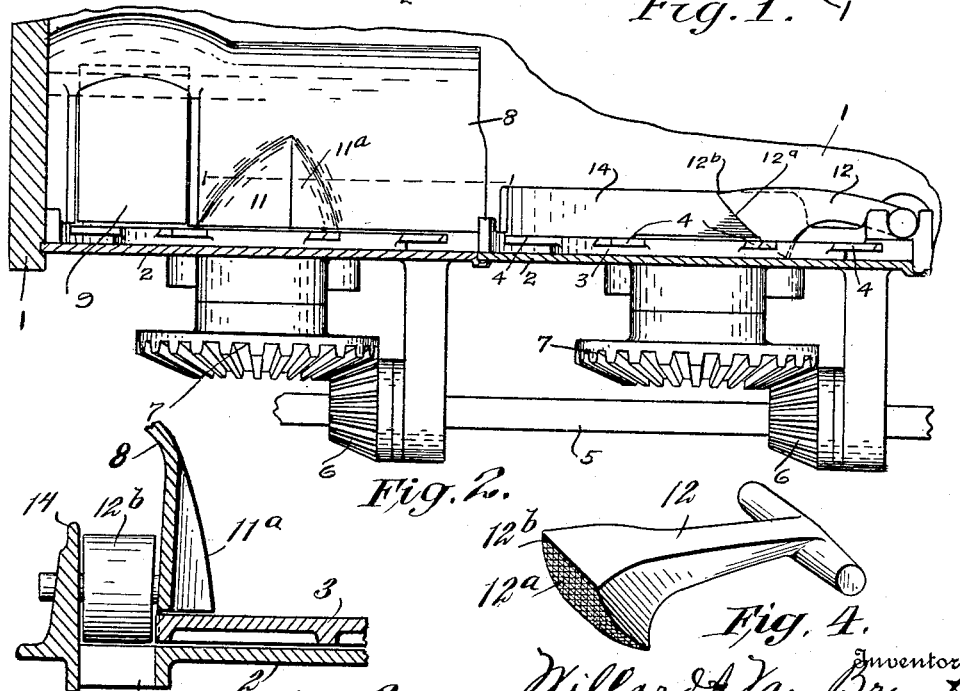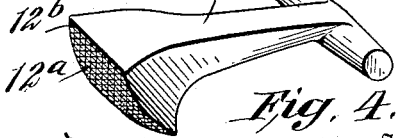

WILLARD A. VAN BRUNT, OF HORICON, WISCONSIN, ASSIGNOR TO THE VAN BRUNT MANUFACTURING COMPANY, OF HORICON, WISCONSIN, A CORPORATION OF WISCONSIN.

FERTILIZER-DISTRIBUTER.

1,195,879.

Specification of Letters Patent.

Patented Aug. 22, 1916.

Application filed October 2, 1914. Serial No. 864,603.

*To all whom it may concern:*

Be it known that I, WILLARD A. VAN BRUNT, a citizen of the United States, residing at Horicon, in the county of Dodge and State of Wisconsin, have invented certain new and useful Improvements in Fertilizer-Distributers, of which the following is a specification.

This invention relates to improvements in fertilizer distributers, and especially to that type of fertilizer distributer used in connection with seeding machines.

The object of the invention is to provide distributing devices which will be simple in construction and have a great efficiency in operation.

In the accompanying drawings:—Figure 1 is a transverse section through a portion of the hopper of a fertilizer distributer, the section being taken just above the distributing devices, two of which are shown, a portion of the shed or housing of one of said devices being broken away and shown in section. Fig. 2 is a longitudinal section on the line 2—2 of Fig. 1, one of the housings or sheds in this case being completely removed. Fig. 3 is a section on the line 3—3 of Fig. 1, with the hopper side, however, omitted and the housing 8 broken away. Fig. 4 is a perspective view of the knocker arm.

Like parts are represented by similar characters of reference in the several views.

In the said drawings, 1 represents the side walls of the hopper, which may be formed of wood in the usual way and 2 are the metallic bottom sections upon which the distributing devices are supported. Each distributing device has a distributing wheel 3, formed with a series of projecting fingers 4 arranged equi-distant about the periphery thereof; these wheels being rotated from a feed shaft 5 through the medium of the beveled pinion 6 and beveled gear 7 connected respectively to the shaft and wheel. Each distributing device also has a shed or housing 8 supported from one wall of the hopper and extending longitudinally thereof just above the feed wheel. A portion of the web of the feed wheel and the fingers 4 are adapted to be revolved beneath the housing and to carry a portion of the fertilizer therein through an opening controlled by the valve 9 and discharge it through the opening 10 in the bottom 2 in a manner common in distributers of this character and in order that this operation may be performed in the most effective way I have devised the following peculiar construction: The valved opening in the forward wall of the housing is of sufficient width to extend over the fingers 4 and also a portion of the web of the wheel 3, and the wall is indented or recessed so as to form an inclined portion 11, which extends from the valved opening to a point in close proximity to the outer periphery of the web of the wheel. Pivoted to the bottom of the hopper is a knocker arm or cut-off 12, which has formed on the free end thereof an enlarged head having a downwardly inclined face 12ª, the lower portion of this face being adapted to be engaged by the fingers 4 so as to lift the arm up to permit the passage of the fingers, the arm afterward falling back by gravity so as to dislodge any fertilizer which may have become clogged between the fingers 4 in the opening; the lower portion of the head being extended downwardly so as to normally lie just above the opening 10. The head of this knocker arm is of a width sufficient to occupy the space between the outer periphery of the web of the distributing wheel and a curved wall 14 which extends upwardly from the hopper bottom from a point adjacent the valved opening therein to a point adjacent the rear of the opening 10. The inclined wall 11, which extends, as before stated, to the outer periphery of the carrying wheel, is also extended to a point coincident with the side of the head of the knocker arm. The top of the knocker arm head lies substantially coincident with the upper edge of the curved wall 14, as shown in Fig. 2, so that this head will form an abutment to effectively close the space between the wall 14 and the inclined portion of the shed.

It will be seen from this construction that part of the fertilizer which is carried in the housing on the web of the wheel 3 will be gradually swept into the discharge opening 10 and the up and down movement of the knocker under the action of the fingers 4 will effectively prevent the fertilizer material from clogging at the end of the inclined wall 11; the close proximity of the wall to this knocker arm effectively preventing any of the fertilizer from being carried past the discharge opening 10.

Having thus described my invention, I claim:

In a fertilizer distributer, a hopper, a housing in said hopper having an inlet opening, said hopper having a discharge opening beneath said housing, a rotatable feed wheel, peripheral fingers on said wheel, said fingers and portions of the web of said wheel being arranged to rotate beneath said housing, a curved wall about said discharge opening, an inclined wall on said housing extending toward said curved wall, and a swinging knocker arm in said housing with the free end thereof in line with said discharge opening and in the path of said fingers and also occupying the space between said curved and inclined walls.

In testimony whereof, I have hereunto set my hand this 13th day of August 1914.

WILLARD A. VAN BRUNT.

Witnesses:
A. W. WILCOX,
J. BODDEN.

Copies of this patent may be obtained for five cents each, by addressing the "Commissioner of Patents, Washington, D. C."